(12) United States Patent
Shoenfeld

(10) Patent No.: US 10,417,847 B1
(45) Date of Patent: Sep. 17, 2019

(54) SECURE UNLOCK OF ROOM MEDICATIONS CABINET

(71) Applicant: Norman A. Shoenfeld, Cypress, TX (US)

(72) Inventor: Norman A. Shoenfeld, Cypress, TX (US)

(73) Assignee: S&S X-Ray Products, Inc., Houston, TX (US)

( * ) Notice: Subject to any disclaimer, the term of this patent is extended or adjusted under 35 U.S.C. 154(b) by 0 days.

(21) Appl. No.: 16/206,316

(22) Filed: Nov. 30, 2018

(51) Int. Cl.
  G07C 9/00 (2006.01)
  G06K 7/10 (2006.01)
  G06K 7/14 (2006.01)
  G06K 19/06 (2006.01)

(52) U.S. Cl.
  CPC ..... *G07C 9/00031* (2013.01); *G06K 7/10722* (2013.01); *G06K 7/1417* (2013.01); *G06K 19/06037* (2013.01)

(58) Field of Classification Search
  CPC .......... G07C 9/00031; G06K 7/10722; G06K 7/1417; G06K 19/06037
  USPC .................................................. 235/375, 382
  See application file for complete search history.

(56) References Cited

U.S. PATENT DOCUMENTS

| | | | |
|---|---|---|---|
| 7,668,620 B2 | 2/2010 | Shoenfeld | |
| 8,160,741 B1 | 4/2012 | Shoenfeld | |
| 9,078,520 B2 | 7/2015 | Shoenfeld | |
| 9,195,804 B2 | 11/2015 | Shoenfeld et al. | |
| 9,977,873 B1 | 5/2018 | Shoenfeld | |
| 2003/0052787 A1* | 3/2003 | Zerhusen | A47B 23/046 340/573.1 |
| 2003/0120384 A1* | 6/2003 | Haitin | A61G 12/001 700/242 |
| 2004/0054436 A1* | 3/2004 | Haitin | A61G 12/001 700/236 |
| 2013/0195326 A1* | 8/2013 | Bear | G06F 19/3456 382/128 |
| 2013/0238119 A1* | 9/2013 | Simmons | A61J 7/0481 700/237 |
| 2013/0317753 A1* | 11/2013 | Kamen | G06F 19/3418 702/19 |
| 2018/0225422 A1* | 8/2018 | Feldman | G06F 19/3462 |
| 2018/0256427 A1* | 9/2018 | Volek | A47B 31/00 |

* cited by examiner

*Primary Examiner* — Paultep Savusdiphol
(74) *Attorney, Agent, or Firm* — Bernhard P. Molldrem, Jr.

(57) ABSTRACT

In a medication administration system, in-room medications cabinets have at least one locked compartment for each patient in the room. The nurse or other caregiver opens the respective compartment by activating a personal electronic device (PED), e.g., cell phone, using a fingerprint or other identifying characteristic, and generates a 2-D bar coded symbol to display on the screen of the PED. The symbol includes the date/time that access was requested. The authorization code, facility code, and date and time are combined and encrypted. The bar-coded symbol is displayed to a reader on the cabinet, which decodes the bar coded symbol, decrypts the contents, and unlocks the patient-specific compartment, but only if the actual time is within a short interval, e.g., 30 seconds, of the date/time in the bar coded symbol. Alternatively, an NFC capability can be employed rather than a bar-coded symbol.

20 Claims, 4 Drawing Sheets

SECURE UNLOCK OF ROOM MEDICATIONS CABINET

BACKGROUND OF THE INVENTION

This invention relates to medications cabinets and similar systems providing storage and access to patient pharmaceuticals and other items to be administered in a hospital, transitional care facility, clinic, or other health care facility where administration of the materials must be managed and controlled. The invention also concerns a simplified method and system for unlocking a patient-specific drawer of a wall-mounted or floor-mounted medications cabinet in or at a patient room, where the cabinet or a patient-specific drawer in it has been pre-loaded with prescription pharmaceuticals for an associated patient, and where the nurse or other care giver assigned to administer the medications can quickly and securely access the patient's assigned drawer (or other compartment).

Currently, to gain access to one of these in-room cabinets, an authorized user has to enter a user ID, which can be a machine readable code on a badge or card, or may be a code that the user enters at a keyboard. To gain access to the assigned drawer or compartment for a given patient, or to the cabinet in a single-patient room, the current systems may require a scan of the patient's wrist band to obtain the patient's assigned code to access the patient's drawer. This can involve use of a bar code scanner connected (wired or wirelessly) to the cabinet. This procedure can be tedious and time consuming when attending to numerous patients throughout a hospital shift. Where a proximity card or badge is required for access the patient's medications, the card or badge may be lost or misplaced or stolen, and used by a different person to obtain access to the medications in the cabinet. Biometric identification, which would make unauthorized access more difficult, is not available on a proximity-card based system.

An improved technique for improving the nurse access to the patient-specific medications drawer for each patient can involve a personal electronic device carried by the care giver, such as a smart cellular phone. Smart phones are often assigned to nurses or other health-care providers, and this is frequently the case in many hospitals. The smart phone may be combined with a near-field communications (NFC) and/or simulated NFC tags or specially encoded bar codes with nurse authentication and time stamp for locking medications storage cabinets in patient rooms that are pre-loaded with the patients' prescribed medications as well as non-prescription items. The cabinets are kept locked, and typically one patient drawer is assigned per patient and these are individually unlocked to obtain that patient's prescriptions. Portable personal electronic devices (PED's), such as smart cellular phones could be used for rapidly unlocking these cabinets without compromising security. Alternatively, NFC tags could be used. A specially generated bar code with a time stamp that expires in a short time window may be used to prevent grant of access based on a printed bar code image, or access from a digital display of a bar code symbol that can be taken with a third-party cell phone.

To access the cabinet, a hand-held PED combines near-field communications (NFC) chip with a smart phone to allow the nurse to unlock the cabinet or drawer of cabinet for the given patient. NFC is preferred over low power Bluetooth as it is limited to 10 cm (whereas Bluetooth could unlock the cabinet and also another nearby cabinet if within a range of 50 to 100 feet). Android phones can be configured to simulate an NFC tag which is preferable to using a static tag, for the reason that by using a phone app, the authorized user can be required to scan in a thumbprint or fingerprint to unlock the phone to "display" the simulated tag. The phone would only present the NFC tag, and signal a drawer-open command, after the nurse holding the phone is identified as authorized.

Another related possibility would use a facility on the phone to simulate this NFC technique using an available bar coding provision in the phone and in the cabinet to unlock the given cabinet or drawer.

OBJECTS AND SUMMARY OF THE INVENTION

It is an object of the present invention to provide a quick but secure technique for an authorized user, e.g., nurse, physician or pharmacist, to access a limited-access patient-specific drawer or compartment in a room cabinet, but which avoids the drawbacks mentioned above.

A major object of the invention is to make the nurse's job significantly easier by providing faster access to the medications cabinet and while also employing added biometric security.

In particular, it is an object to increase security and speed of access by using a fingerprint scanner and/or facial recognition or similar technique on the nurse's cellphone or other similar personal electronic device by use of the imbedded fingerprint scan facility or facial recognition facility of the device.

It is a related object to avoid the need for manual input of user ID, and in most cases not requiring a separate scan of a patient's ID wrist band or bracelet.

It is another related object to permit as an alternative the use of near-field communications (NFC) elements or equivalent NFC facility to communicate access data with the cabinet as an alternative to the bar coded symbol.

It is another object to provide a technique for accessing the patient specific drawer(s) or compartment(s) in a medications cabinet in or near a patient hospital room or clinic room, and which can provide access history, that is, an audit trail of persons accessing and attempting access to the cabinet or cart, and/or optionally including visual identity information of the person attempting access.

It is more specific object to provide access by use of a short-lifetime symbol or code that can grant access and unlock the particular patient-specific compartment or drawer in the cabinet, while defeating any attempts to trick or fool the system.

In a preferred embodiment, a personal electronic device, e.g., phone, is assigned to each nurse or other caregiver. The personal electronic device is loaded with an app that displays a 2D barcode that is encoded and encrypted with both the time/date and the nurse's user ID, as well as a facility code (to prevent use in a different facility). As a security enhancement, the 2D barcode can include a patient ID. This involves compatible software in the wall-mounted cabinet's computer controller to read and translate the bar code on the nurse's phone. When the nurse unlocks the phone (e.g., with finger print or thumb print) and opens the app, the app displays this timed and dated barcode. The barcode is pointed to the camera (or webcam) attached to the in-room cabinet. The cabinet then reads this barcode and determines whether the date/time is within some interval, e.g., 30 seconds or 60 seconds depending on the medical facility. If the ID matches and the facility code matches, access is granted to the cabinet (or patient drawer). If the user is too late, however, the cabinet will not respond. The barcode can be refreshed by tapping the screen of the cell phone. As back-up, a user can still enter his or her identity and authorization codes manually. For added security, rather than just date/time, a "random" code is preferably generated based on time/date in combination with the user ID which can then be decoded by the cabinet software.

The nurse or other caregiver first accesses the phone using its built-in biometric security (i.e., fingerprint scan or facial recognition).

The device (e.g., smart phone) assigned to the nurse will only recognize the specific nurse's fingerprint, for example, and wake up the app. While fingerprint recognition is preferred, the nurse can also wake up the app to gain authorized access by use of facial recognition (FR), initiated by speaking an "activation word" which would then require the smart phone to capture an image of the nurse's face.

In one possible implementation in a hospital or clinic environment, where a caregiver, e.g., nurse, is responsible for the administration of medications to respective patients in the hospital or clinic, the hospital or clinic can have one or more medications cabinets located in proximity to the respective patient or patients. The medications cabinets each have one or more patient-specific locked compartments configured to be pre-loaded with prescribed medications for a respective one of the patients. For example in a two-person room, there may be a wall-mounted cabinet with at least two locking, pull-out medications drawers, with one drawer containing the medications for the patient assigned to bed A, and at least one drawer containing medications for the patient assigned to bed B or a drawer that may contain supplies for a specific department (such as respiratory therapy supplies). Each such medications cabinet has a controller, e.g. an incorporated computer, that includes a mechanism keeping local time. The cabinet is configured for permitting an authorized caregiver to open and access the specific compartment(s). In a preferred configuration, the cabinet has a video reader for reading and decoding two-dimensional coded symbols.

The nurse or other caregiver assigned for the patient carries a personal electronic device provided by the hospital or other care facility, which may be a cellular phone or equivalent. The phone or equivalent personal electronic device has an input mechanism for receiving personal identifying information from the caregiver and for inputting patient specific identification. A viewing screen on the phone or equivalent device is set up for visible display of a two-dimensional coded symbol generated in the personal electronic device, and also has an internal clock generating a local time signal representative of actual clock time, synchronized to within about a second of actual time. The caregiver authorization can be obtained from a visual facial scan or fingerprint scan, e.g., or scan of the caregiver's ID badge. In an alternative configuration, for added security the patient identification may be obtained by a scan of the patient wristband.

The medications cabinet and the personal electronic device each are programmed to function together to permit the caregiver to obtain quick but secure access to the medications drawer or compartment assigned to the given patient. In this embodiment the personal electronic device generates the two-dimensional coded symbol such that the same can be decoded to yield a caregiver authorization code, a facility code, and a local time as represented by the generated local time signal when the symbol was created. The medications cabinet is programmed such that when the patient identity matches the patient identity code for the associated patient specific compartment, the caregiver authorization code identifies the caregiver as being authorized access to the cabinet or an associated patient-specific compartment, and the decoded local time is within a predetermined interval of the actual time (e.g., within 30 seconds to 60 seconds) as determined in the medications cabinet, then the cabinet is unlocked or an associated patient-specific compartment for a respective patient is unlocked. The cabinet or drawer is unlocked only if the decoded time is within the predetermined interval. If the time represented in the 2-D barcode symbol is outside the 30 to 60 second time interval, the code is considered stale, and will not open the medications drawer or compartment. The nurse can re-initiate the sequence by tapping the bar code representation on the cell phone screen to obtain a fresh 2-D bar code to be displayed to the reader device on the cabinet. The nurse may also enter the required identifications and access codes manually, if need be.

The use of the smart phone for access is intended to occur as follows: The authorized user, usually the nurse or other caregiver opens the access phone app by use of the fingerprint scan. The first time the app is opened, e.g., upon installation by the hospital IT department, the assigned user ID for that caregiver, and the facility code for the given hospital or clinic are entered and stored on the personal electronic device. The caregiver user does not change these. When the access phone app is opened again (by the caregiver using his or her fingerprint) the 2D barcode is displayed, and there is no need to provide or enter the user credentials again. If the user waits to long to open the cabinet, i.e., if the bar coded symbol is presented after its expiration, i.e., after 30 seconds, the bar coded symbol can be refreshed by the caregiver simply tapping on it.

Thus, to access the phone app for cabinet access, the phone has to be opened by the specific assigned user, and the phone's biometric security is used to restrict opening the phone to the assigned user only for opening the phone app. This will preferably give the nurse access to each of the patient room cabinets on his or her treatment route. Additional security features can be added, depending on the need.

The personal electronic device can be a hospital-assigned smart phone that can be carried or worn, and which has a viewing screen on which the two-dimensional bar code can be presented. The device also may have a video camera to serve as video input device for reading a patient identification code, and as reader mechanism for reading an identifying characteristic of the associated caregiver, such as face or fingerprint. The patient ID may be obtained from an RFID chip in some cases.

In some embodiments, the personal electronic devices and the medications cabinets may each include an electronic component with near field communications (NFC) capabilities. This permits radio communications between the devices when held within a few inches of one another, and may obviate the need to create the two-dimensional bar coded symbol. These devices may still include the time feature to ensure that the access code is fresh and not stale.

The above technique can avoid being tricked or "fooled" by representation of the required bar coded symbol (or equivalent) which lacks the feature of being created within a short time interval prior to the request for access and lacks the proper facility code.

The requirement for nurse identity and time of access also facilitates keeping an access record (including a record of unsuccessful attempts to access the medications cabinets), so that there is an audit trail for each assigned patient drawer or compartment.

These and many other objects, features, and advantages of the medications cabinet access system will be appreciated from the ensuing description, when considered in connection with the accompanying Drawing figures.

DETAILED DESCRIPTION OF A PREFERRED EMBODIMENT

Figure 1:
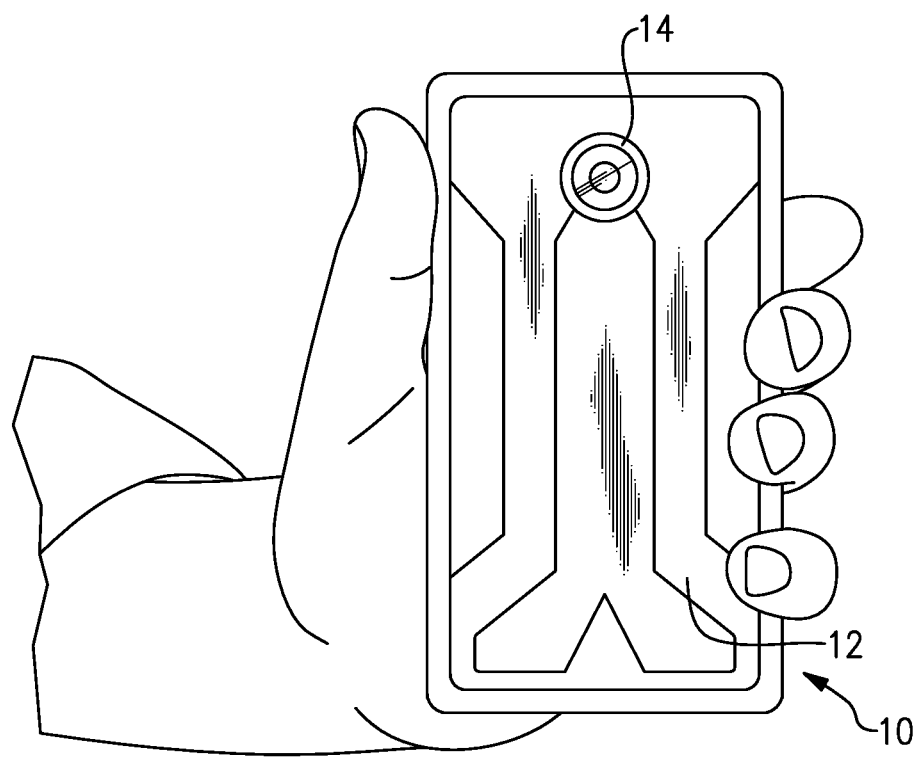
FIG. 1 shows the reverse or back of a cellular "smart" phone, which may be employed in an embodiment of this invention.
Figure 2:
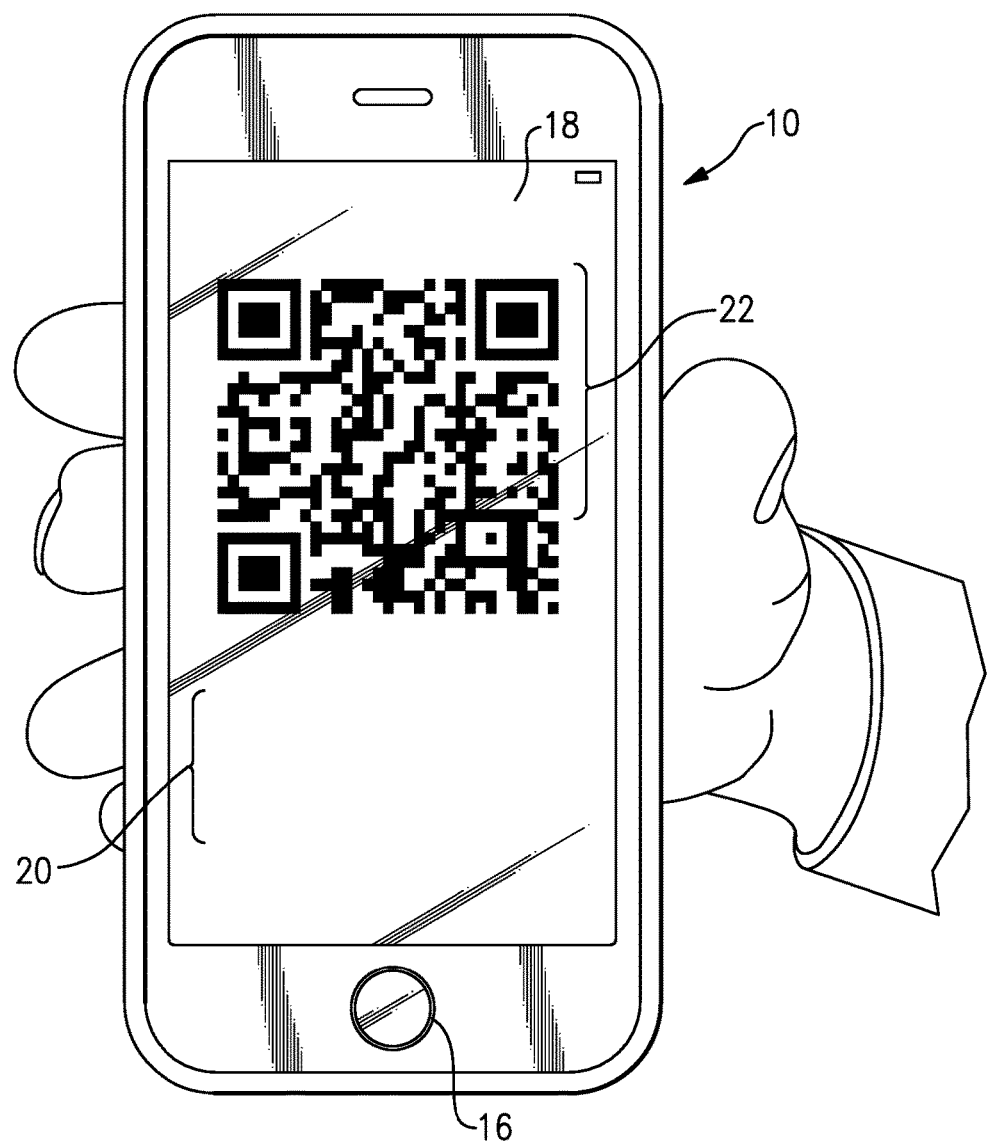
FIG. 2 shows the front or screen side of the cellular "smart" phone, here displaying a 2-D bar coded symbol for opening a specific compartment or drawer of a medications cabinet, or for obtaining access to a room medications cabinet.

With reference to the Drawing, FIG. 1 and FIG. 2 show the back and front of a cellular phone 10, here adapted for opening and accessing patient-specific drawers, bins, or other compartments in a medications cabinet configured according to an embodiment of the present invention. FIG. 1 shows the back 12 of the phone where there is located a camera 14. A fingerprint reader area 16 is located on the front screen as shown in FIG. 2. The camera may be used to obtain patient information for a given patient in his or her patient room, e.g., by scanning the codes on the patient's wrist bracelet. The fingerprint area 16 can be used to read the user's finger print or thumbprint, e.g. to verify that the user is authorized to access the medications cabinet in question. When a care-giver, i.e., nurse or pharmacist, needs to access a given cabinet to obtain a patient's prescription and non-prescription medications, he or she unlocks the phone placing the finger onto the area 16 to wake up the phone's access application. This verifies or authenticates the user's authorization to access the cabinet or the patient's drawer or compartment. The phone 10 is loaded with an app or software that creates the display such as is shown in FIG. 2, and optionally the date and time that access was requested. The caregiver's name may appear here in an identification area 20 on the screen 18. At the same time the software produces a two-dimensional bar code 22 that is displayed on the screen 18. The 2-D bar code 22 is configured to contain the user's authorization code and facility code, and also to contain the date and time access was requested by the user. The bar code 22 is placed where it can be picked up by a camera or reader on the in-room medications cabinet so as to open a particular drawer or drawers associated with that patient, or in the case if a single-patient room, simply to unlock the room cabinet.

Preferably, the user identification, date/time, and a specific facility code are used to encrypt the data displayed in the 2-D bar code symbol. The facility code is used to make the bar code symbol specific to the hospital using these cabinets. The same information is stored in the cabinet controller, and is used to decrypt the information in the bar code symbol to ensure proper user credentials.

Figure 3:
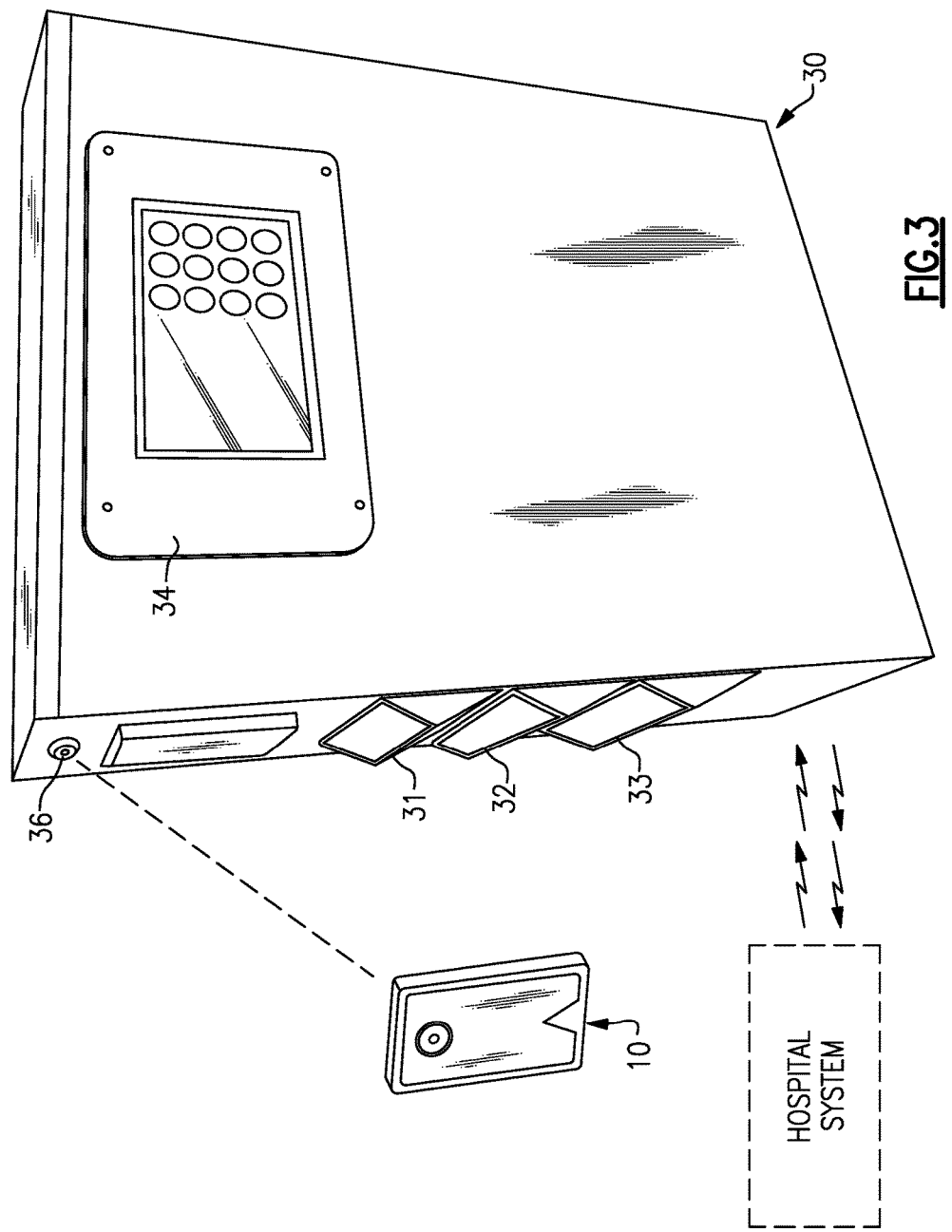
FIG. 3 illustrates an implementation of an embodiment of the invention employing a wall-mounted in-room medications cabinet in a hospital or similar environment.

As shown in FIG. 3, a wall-mounted medications cabinet 30 has a number of locking drawers 31, 32, 33 that open and pull out to the side, a touch-screen computer 34 incorporated in to a front wall of the cabinet 30 and a camera 36. The camera 36 can also be positioned inside the top of the unit next to the display of the computer 34, or on the top of the unit. In this case, the cellular phone 10 is positioned so that the cabinet's camera 36 can view and read the bar coded symbol 22 displayed on the phone 10. There is software in the computer 34 that interprets and decodes the 2-D symbol 22, including the date and time as well as the user access code, and (optionally) the patient identity. The computer 34 compares the time that is contained in the bar code with the clock time that is constantly being updated on the computer 34. If the difference between the two times, i.e., the cabinet computer time and the bar-coded symbol time, is within a predetermined time differential or interval, e.g., 30 seconds, and if the user is indicated as being authorized access, then the cabinet 30 will unlock (and open) the associated patient-specific drawer e.g., drawer 31. The identity of the patient can optionally be embedded in the bar coded symbol 22 as a secondary consideration. If the time differential is greater than the predetermined interval, i.e. greater than thirty seconds, then the bar coded symbol is interpreted as being stale, and the patient-specific drawer will not open.

For each patient there may be a second drawer e.g., drawer 33, containing other medications or medical items such as bandages, antiseptics, or other items to be administered such as vitamins or food supplements that are not prescription medications. The second drawer may also be used with a second patient in the same room who would have his or her own assigned patient-specific drawer, e.g. drawer 32.

As shown also, the cabinet 30 may be linked to the hospital computer system, to report any attempts to access or open any of the drawers 31, 32, 33 of the cabinet 30, with the identity of the person attempting access, and whether successful or denied.

Figure 4:
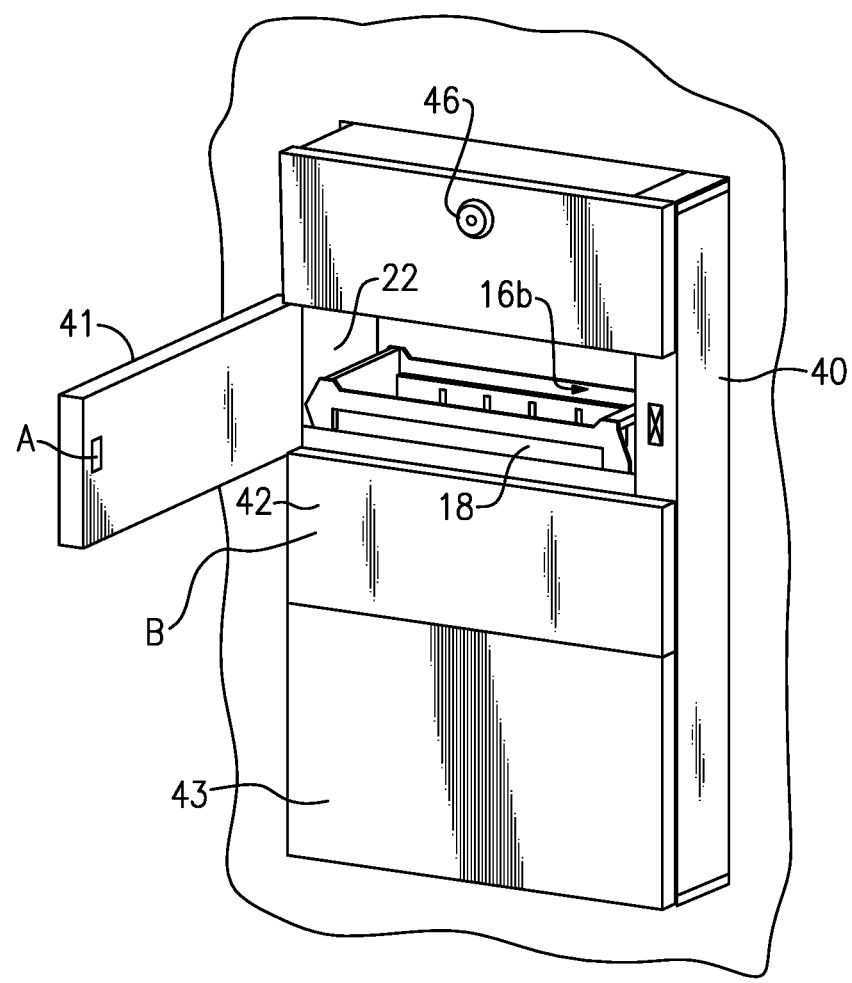
FIG. 4 illustrates an alternative embodiment employing a wall-mounted pass-through room medications cabinet.

Another in-room medications cabinet 40 which can be employed with the technique of this invention is shown in FIG. 4. In this case the cabinet 40 is built into a wall of the room as a pass-through cabinet that can be loaded from the hallway side of the cabinet and accessed for administration of the medications from the room side. The cabinet has a first patient-specific compartment 41, here shown with its door open and with a medications tray inside, a second patient specific compartment 42, shown with door closed, and a third compartment 43, which may serve as a common compartment for keeping non-prescription supplies. For a two-patient room, the first compartment 41 may be assigned for the patient in bed A, the second compartment 42 for the patient in bed B. A video camera 46 is incorporated into this cabinet 40 for reading or scanning the bar coded symbol 22, when the user presents the phone 10 in the camera's viewing zone.

An alternative to the use of a 2-D bar code could employ a near-field communications (NFC) device which is a small chip fitted into the personal electronic device and similarly fitted to the in-room medications cabinet. A similar procedure to that described would be used to obtain caregiver authorization and patient identification, but the phone or other personal electronic device would be placed in close proximity to the cabinet, i.e. close to the location of the NFC chip, to communicate the information and obtain access to the given patient-specific drawer or compartment.

An over-ride can be employed in some instances to provide access for a person without the assigned personal electronic device e.g., cellular phone. This can involve manual entry of the caregiver authorization code or optionally by use of a proximity RFID card. A fingerprint scan, retinal scan, etc. can be used for secondary verification.

In any of these configurations, either or both of the cabinet computers or the hospital computer system that the cabinets communicate with, contains suitable software configured to keep an audit trail of all attempts to access each cabinet, whether successful or unsuccessful.

While the invention has been discussed in reference to a preferred embodiment, the invention is not limited to that embodiment and it should be recognized that many modifications and variations are possible without departing from the scope and spirit of this invention, as defined in the appended Claims.

What is claimed is:

1. A hospital or clinic system for the administration of medications to respective patients in the hospital or clinic comprising
    one or more medications cabinets each located in proximity to respective patient or patients, the medications cabinets each having one or more patient-specific locked compartments configured to be pre-loaded with prescribed medications for a respective one of the patients; each said medications cabinet including a controller having a mechanism keeping local time, and configured for permitting an authorized caregiver to open and access the patient-specific compartment, and having a video reader for reading and decoding two-dimensional coded symbols;
    wherein said hospital or clinic has a respective facility code;
    at least one personal electronic device carried by a respective caregiver, the personal electronic device including an input mechanism for receiving personal identifying information from said caregiver and for inputting identification data; a screen adapted for displaying said two-dimensional coded symbol generated in the personal electronic device; and a clock generating a local time signal representative of actual clock time;
    the medications cabinet and the personal electronic device each being suitably programmed such that the personal electronic device generates the two-dimensional coded symbol in a form that is adapted to be decoded to yield a caregiver authorization code, said facility code, and a local time as represented by said generated local time signal when said symbol was created; and wherein said caregiver authorization code, said facility code and said local time are encrypted prior to generating said two-dimensional bar coded symbol; and
    said medications cabinet controller being programmed such that said medications cabinet controller decrypts the caregiver authorization code, the facility code, and the local time as presented in said two-dimensional bar-coded symbol, and when the caregiver authorization code identifies the caregiver as being authorized access to said associated, the facility code matches the facility code of the respective hospital or clinic, and the decoded local time is within a predetermined interval of the actual time as determined in said medications cabinet, the cabinet unlocks the associated patient-specific compartment for said respective patient, but only if the decoded time is within said predetermined interval.

2. The hospital or clinic system according to claim 1, wherein the hospital or clinic has patient rooms each with beds for one or more patients, and said medications cabinets are distributed one cabinet in each said patient room, and said medications cabinets each have at least one said patient-specific compartment for each patient in the associated patient room.

3. The hospital or clinic system according to claim 1, wherein said personal electronic device is a smart phone having a viewing screen on which a two-dimensional bar code can be presented, and a reader mechanism for reading an identifying characteristic of the associated caregiver.

4. The hospital or clinic system according to claim 3, wherein said identifying characteristic is a finger print, and said personal electronic device includes a facility for recognizing a finger print of an authorized caregiver.

5. The hospital or clinic system according to claim 1 wherein said medications cabinet controller for each said cabinet is coupled to communicate with a hospital computer system, and one or both of said controller and said hospital computer system is configured to keep an audit trail of successful attempts and unsuccessful attempts to access the respective cabinets.

6. A hospital or clinic system for the administration of medications to respective patients in the hospital or clinic comprising
    one or more medications cabinets each located in proximity to respective patient or patients, the medications cabinets each having one or more locked compartments configured to be pre-loaded with prescribed medications for a respective one of the patients; each said medications cabinet including a controller having a mechanism keeping local time, and configured for permitting an authorized caregiver to open and access the compartment, and having a video reader for reading and decoding two-dimensional coded symbols;
    at least one personal electronic device carried by a respective caregiver, the personal electronic device including an input mechanism for receiving personal identifying information from said caregiver; a screen adapted for displaying said two-dimensional coded symbol generated in the personal electronic device; and a clock generating a local time signal representative of actual clock time;
    the medications cabinet and the personal electronic device each being suitably programmed such that the personal electronic device generates the two-dimensional coded symbol in a form that is adapted to be decoded to yield a caregiver authorization code and a local time as represented by said generated local time signal when said symbol was created, and wherein said caregiver authorization code and said local time are encrypted prior to generating said two-dimensional bar coded symbol;
    said medications cabinet controller being programmed such that when said two-dimensional bar-coded symbol is read and decrypted, the caregiver authorization code identifies the caregiver as being authorized access to said associated patient-specific compartment, and the decoded local time is within a predetermined interval of the actual time as determined in said medications cabinet, the cabinet unlocks the associated compartment for said respective patient, but only if the decoded time is within said predetermined interval.

7. The hospital or clinic system according to claim 6, wherein the hospital or clinic has patient rooms each with beds for one or more patients, and said medications cabinets are distributed one cabinet in each said patient room, and said medications cabinets each have at least one patient-specific compartment for each patient in the associated patient room.

8. The hospital or clinic system according to claim 6, wherein said personal electronic device is a smart phone having a viewing screen on which a two-dimensional bar code can be presented, a video input device for reading a patient identification code, and a reader mechanism for reading an identifying characteristic of the associated caregiver.

9. The hospital or clinic system according to claim 8, wherein said personal electronic device includes a component with near field communications (NFC) capabilities wherein said identifying characteristic is a finger print, and said personal electronic device includes a facility for recognizing a finger print of an authorized caregiver.

10. The hospital or clinic system according to claim 6, wherein said medications cabinet controller for each said cabinet is coupled to communicate with a hospital computer system, and one or both of said controller and said hospital computer system is configured to keep an audit trail of successful attempts and unsuccessful attempts to access the respective cabinets.

11. A hospital or clinic system for the administration of medications to respective patients in the hospital or clinic comprising
   one or more medications cabinets each located in proximity to respective patient or patients, the medications cabinets each having one or more patient-specific locked compartments configured to be pre-loaded with prescribed medications for a respective one of the patients; each said medications cabinet including a controller having a mechanism keeping local time, and configured for permitting an authorized caregiver to open and access the patient-specific compartment, and having a video reader for reading and decoding two-dimensional coded symbols;
   at least one personal electronic device carried by a respective caregiver, the personal electronic device including an input mechanism for receiving personal identifying information from said caregiver and for inputting patient specific identification; a screen adapted for displaying said two-dimensional coded symbol generated in the personal electronic device; and a clock generating a local time signal representative of actual clock time;
   the medications cabinet and the personal electronic device each being suitably programmed such that the personal electronic device generates the two-dimensional coded symbol in a form that is adapted to be decoded to yield a caregiver authorization code, a patient identity code, and a local time as represented by said generated local time signal when said symbol was created; and
   said medications cabinet controller being programmed such that when the patient identity code matches the patient identity for the associated patient-specific compartment, the caregiver authorization code identifies the caregiver as being authorized access to said associated patient-specific compartment, and the decoded local time is within a predetermined interval of the actual time as determined in said medications cabinet, the cabinet unlocks the associated patient-specific compartment for said respective patient, but only if the decoded time is within said predetermined interval.

12. The hospital or clinic system according to claim 11, wherein the hospital or clinic has patient rooms each with beds for one or more patients, and said medications cabinets are distributed one cabinet in each said patient room, and said medications cabinets each have at least one said patient-specific compartment for each patient in the associated patient room.

13. The hospital or clinic system according to claim 11, wherein said personal electronic device is a smart phone having a viewing screen on which a two-dimensional bar code can be presented, a video input device for reading a patient identification code, and a reader mechanism for reading an identifying characteristic of the associated caregiver.

14. The hospital or clinic system according to claim 13, wherein said identifying characteristic is a finger print, and said personal electronic device includes a facility for recognizing a finger print of an authorized caregiver.

15. The hospital or clinic system according to claim 11, wherein said medications cabinet controller for each said cabinet is coupled to communicate with a hospital computer system, and one or both of said controller and said hospital computer system is configured to keep an audit trail of successful attempts and unsuccessful attempts to access the respective cabinets.

16. A hospital or clinic system for the administration of medications to respective patients in the hospital or clinic comprising
   one or more medications cabinets each located in proximity to respective patient or patients, the medications cabinets each having one or more locked compartments configured to be pre-loaded with prescribed medications for a respective one of the patients; each said medications cabinet including a controller having a mechanism keeping local time, and configured for permitting an authorized caregiver to open and access the compartment, and having a near-field communications facility incorporated into it;
   at least one personal electronic device carried by a respective caregiver, the personal electronic device including an input mechanism for receiving personal identifying information from said caregiver; a clock generating a local time signal representative of actual clock time; and an NFC capability for the near field communications facility of said cabinet when the near-field communications facility of said cabinet is within a short-distance on the order of several inches from said personal electronic device; and
   the medications cabinet and the personal electronic device each being suitably programmed such that the personal electronic device generates and encrypted signal to be decoded to yield a caregiver authorization code, and a local time as represented by said generated local time signal when said symbol was created, said encrypted signal to be transmitted by the near-field capability of said personal electronic device to the near field facility of said cabinet when the personal electronic device is within said short distance from said cabinet; and
   said medications cabinet controller being programmed such that when the caregiver authorization code identifies the caregiver as being authorized access to said associated compartment, and the decoded local time is within a predetermined interval of the actual time as determined in said medications cabinet, the cabinet unlocks the associated patient-specific compartment for said respective patient, but only if the decoded time is within said predetermined interval.

17. The hospital or clinic system according to claim 16, wherein the hospital or clinic has patient rooms each with beds for one or more patients, and said medications cabinets are distributed one cabinet in each said patient room, and said medications cabinets each have at least one said patient-specific compartment for each patient in the associated patient room.

18. The hospital or clinic system according to claim 16, wherein said personal electronic device is a smart phone having a viewing screen, a video input device for reading an identification code, and a reader mechanism for reading an identifying characteristic of the associated caregiver.

19. The hospital or clinic system according to claim 16, wherein said personal electronic device includes a solid-state discrete component with near field communications (NFC) capabilities.

20. The hospital or clinic system according to claim 16, wherein said medications cabinet controller for each said cabinet is coupled to communicate with a hospital computer system, and one or both of said controller and said hospital computer system is configured to keep an audit trail of successful attempts and unsuccessful attempts to access the respective cabinets.

\* \* \* \* \*